United States Patent [19]
Grundman

[11] 3,853,142
[45] Dec. 10, 1974

[54] FLOW CONTROL SYSTEM

[75] Inventor: Richard G. Grundman, Coopersville, Mich.

[73] Assignee: General Motors Corporation, Detroit, Mich.

[22] Filed: May 2, 1973

[21] Appl. No.: 356,291

[52] U.S. Cl............... 137/487.5, 137/501, 137/503, 137/613
[51] Int. Cl............................................. F16k 21/00
[58] Field of Search ........ 137/501, 503, 487.5, 566, 137/569, 613, 614, 512, 512.3, 528, 538; 251/282

[56] References Cited
UNITED STATES PATENTS

| | | | |
|---|---|---|---|
| 2,742,764 | 4/1956 | St. Clair | 137/613 X |
| 2,807,144 | 9/1957 | St. Clair | 137/501 X |
| 2,980,176 | 4/1961 | Torell | 137/613 |
| 2,990,847 | 7/1961 | Absalom | 137/501 X |
| 3,116,600 | 1/1964 | Fleming et al. | 137/501 X |
| 3,123,128 | 3/1964 | Zeisloft | 137/501 X |

*Primary Examiner*—William R. Cline
*Assistant Examiner*—Robert J. Miller
*Attorney, Agent, or Firm*—Paul Fitzpatrick

[57] ABSTRACT

A system for controlling flow of fuel to a gas turbine engine in response to an electrical signal. The signal, which may come from any suitable device responsive to engine parameters, actuates a solenoid device which biases a balance valve to open. Fuel is supplied by a pump and throttled through the balance valve and a flow sense valve to the engine. The flow sense valve is biased to open by pressure upstream and to close by pressure downstream; also, to close by a spring. It has contoured metering ports so that flow is a suitable function of displacement of the valve spool and thus to pressure drop through the valve. The balance valve is biased to open by the pressure of the delivered fuel and to close by the pressure of the fuel supplied from it to the flow sense valve; that is, in reverse sense by the same pressure differential that opens the flow sense valve. The pressure differential across the balance valve is thus a function of the excitation of the solenoid, so that fuel flow is a function of this excitation. The by-pass valve returns excess pump discharge in response to the pressure drop from the entrance to the balance valve to a point downstream of the balance valve only, or of both valves. This maintains a sufficient pressure head in the system notwithstanding changes in back pressure at the fuel outlet and avoids unnecessary loading of the pump.

7 Claims, 8 Drawing Figures

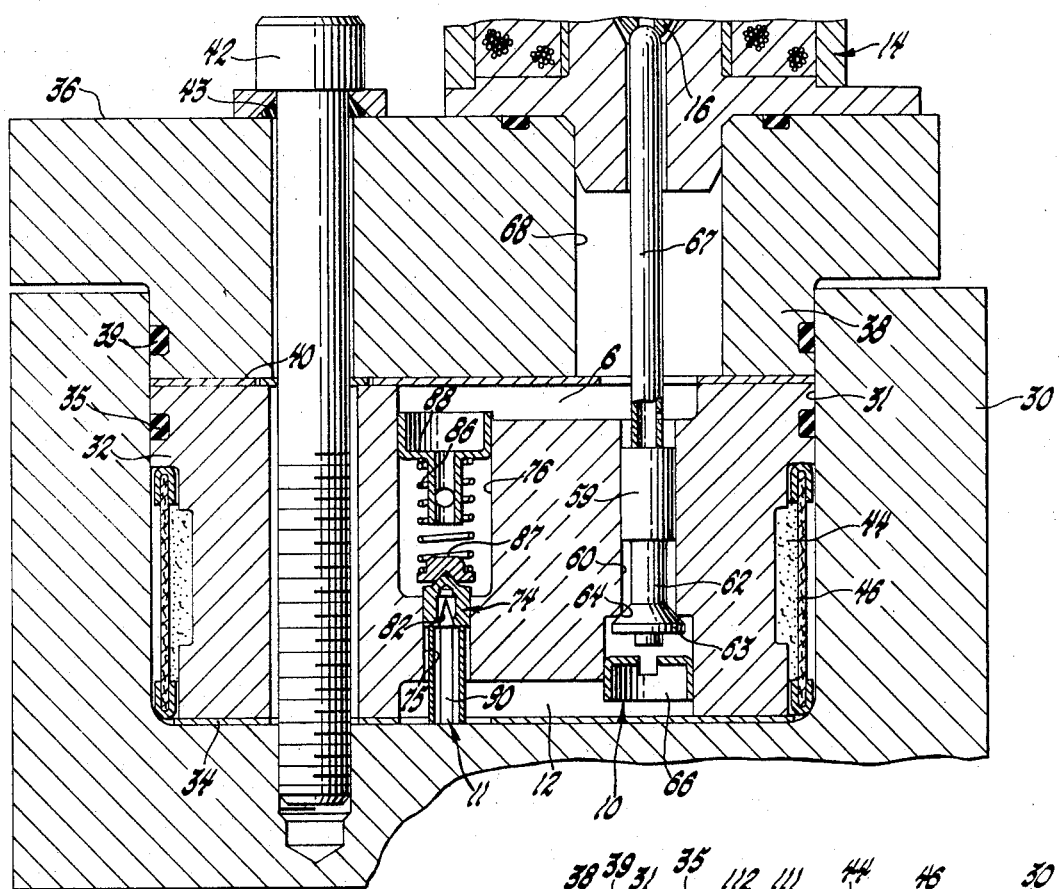
Fig. 6
Fig. 8
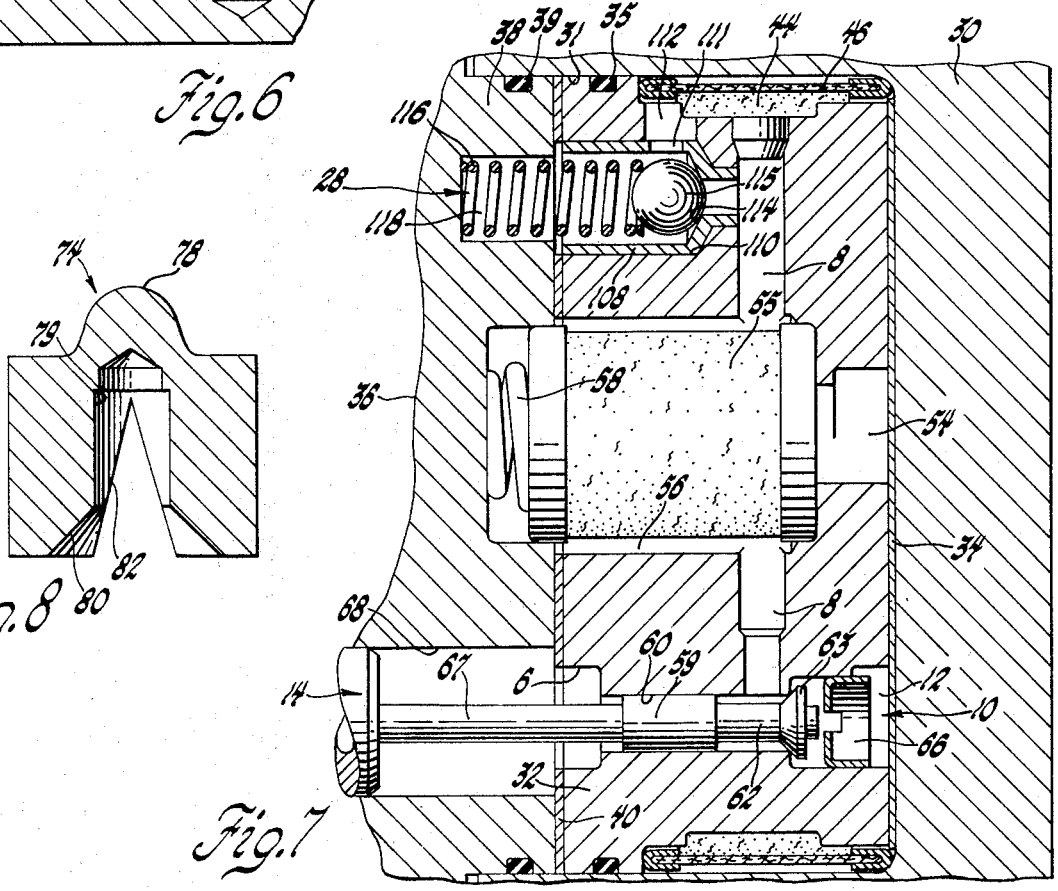
Fig. 7

FLOW CONTROL SYSTEM

My invention is directed to a system for controlling flow of fluids, particularly liquids, and specially adapted to control flow of fuel to a gas turbine engine. The system responds to a force exerted by an input member which may, for example, be an armature of a solenoid device responding to current supplied to it by some control device which responds to an engine power demand signal and to signals indicative of engine rpm, temperture, and other such control parameters, as is well known to those skilled in the art.

My invention is directed to what may be termed the interface between the electrical system and the means pumping and controlling flow of fuel. While so far specifically directed to the fuel system of a gas turbine engine, it appears that the invention may find uses in other situations which require accurate control of rate of flow of a liquid, insensitive to back pressure at the point of discharge, and suited to be controlled by a relatively small force.

The principal objects of the invention are to provide a simple, compact, accurate, and sensitive flow regulating system; to provide such a system particularly suited for control of gas turbine fuel flow, and to provide a system which is well suited to the requirements of practice.

A further object of the invention is to provide a flow control system in which flow is metered by a value which opens in response to the pressure differential across it and in which this pressure differential is controlled by a second valve responsive to the pressure differential and to an input force signal.

The nature of the invention and its objects and advantages will be clear to those skilled in the art from the succeeding detailed description of preferred embodiments of the invention and the accompanying drawings.

FIG. 6 is an enlarged cross sectional view taken on the planes indicated by the line 6—6 in FIG. 3.

FIG. 7 is an enlarged cross sectional view taken on the plane indicated by the line 7—7 in FIG. 3.

FIG. 8 is a longitudinal section of the flow sense valve piston head.

Figure 1:
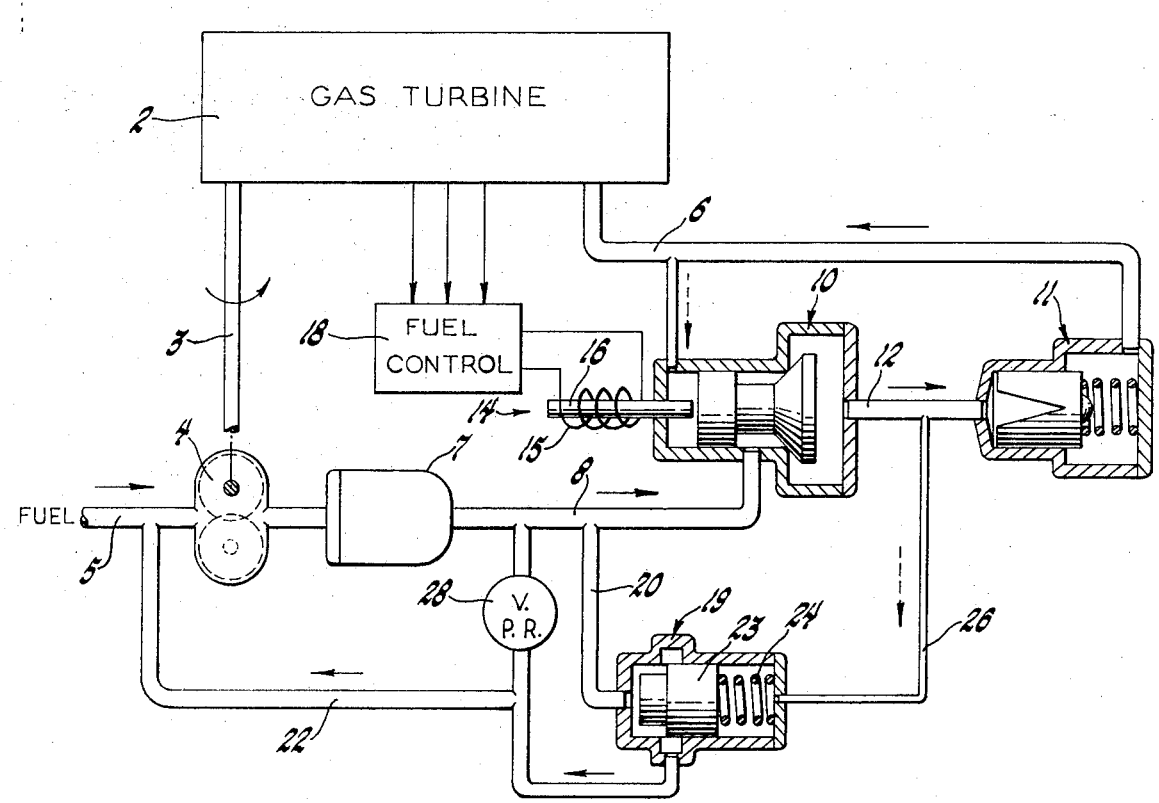
FIG. 1 is a schematic diagram of a gas turbine fuel control system.

Referring to FIG. 1, a gas turbine engine 2 is indicated as driving an accessory shaft 3 which, among other things, drives a fuel pump 4. The pump may receive fuel from a line 5 leading from a fuel tank or the like. The fuel is ultimately supplied to the engine through engine fuel line 6 which may lead to suitable fuel spraying nozzles (not illustrated).

As shown in FIG. 1, pump 4 discharges the fuel through a filter 7 to a pressurized fuel line 8. From line 8 the fuel proceeds to the engine fuel line 6 through a balance valve 10 and a flow sense valve 11, these being connected in series through an intermediate line 12.

The command input determining the amount of fuel supplied to the engine is transmitted by a solenoid device or thruster 14 including a solenoid 15 and an armature 16. The solenoid is energized by a fuel control 18 which may be of any suitable type. My invention is not concerned at all with the details of such controls, which are known to those skilled in the art. Such controls ordinarily include some means for controlling the power output of the engine and include inputs of engine speed, temperature, and acceleration, for controlling the engine to the desired power level and preventing harmful overspeed, overtemperature, flameouts, and other improper operation of the engine.

To supply a given amount of fuel to the engine, the pressure in line 6 ordinarily must exceed the pressure at the point of injection of the fuel into the engine by a predetermined amount, this excess pressure being a function of the rate of fuel flow. Therefore, the pressure in line 6 may vary quite widely, and the rate of flow should be independent of the pressure in line 6. Also, it is desirable to use a constant volume positive displacement pump. With a pump sufficient to provide for all conditions of engine operation there is ordinarily an excess of fuel delivered by the pump. To handle the excess of fuel and to control the discharge pressure of the pump at a level which provides for satisfactory metering of the fuel but eliminates unnecessary pressurization of the pump with attendant wear and power loss, a by-pass valve 19 is provided which takes fuel from a branch 20 of the pressurized fuel line 8 and returns it to the pump inlet through a return or by-pass line 22.

As shown in FIG. 1, the by-pass valve includes a spool or piston 23 biased to close the valve by a compression spring 24, to open the valve by the pressure in line 20, and to close the valve by a pressure taken from the fuel conduit downstream of valve 10. In the system of FIG. 1, the valve closing pressure is supplied through a line 26 from the line 12 between the valves. Thus the by-pass or return valve 19 responds to the pressure drop across the balance valve 10.

Figure 2:
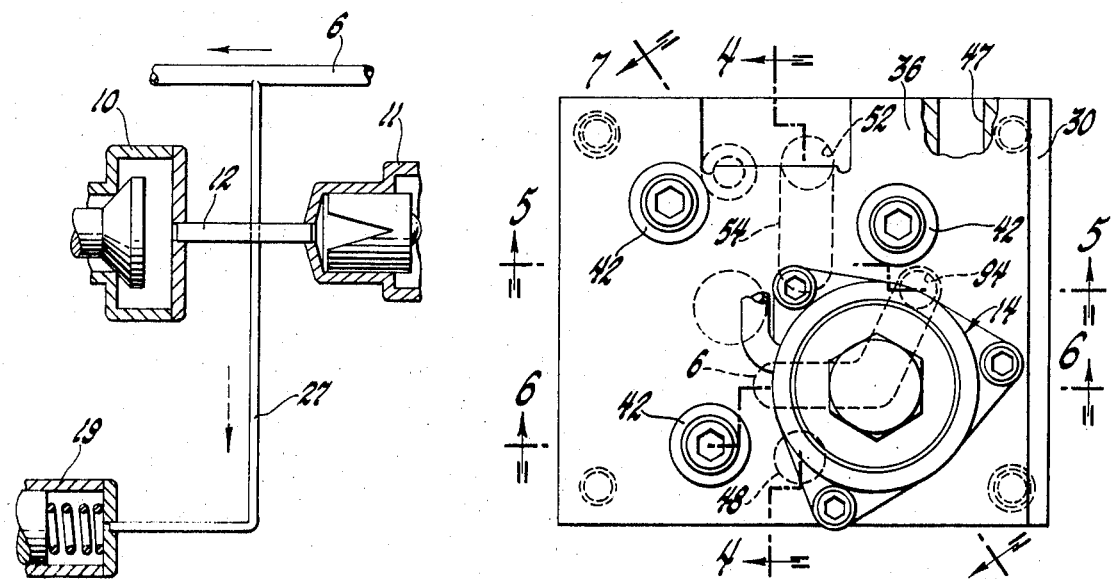
FIG. 2 is a partial diagram of a modified system.

In the modified system illustrated fragmentarily in FIG. 2 the valve 19 is biased through a line 27 branching from the fuel delivery conduit 6 and thus the bypass valve responds to the total pressure drop across valve 10 and 11. The system of FIG. 2 is otherwise identical to that of FIG. 1. The system of FIG. 1 is presently preferred, as it allows lower pump discharge pressure at low flows.

Additionally, my system includes a maximum pressure relief valve 28 which is an emergency valve, since in normal operation of the system the pressure setting of this valve is not reached, due to the action of valve 19.

The mode of operation of the system will be discussed more fully after consideration of the preferred structural embodiment of the control system as illustrated in FIGS. 3 through 8.

Figure 3:
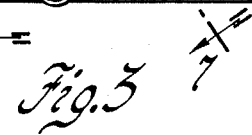
FIG. 3 is a front face view of a control assembly.

FIG. 3 is approximately a full scale front view of a control assembly suitable for an engine of about 400 horsepower. The control assembly comprises a generally rectangular housing 30 having a central cylindrical cavity 31. An annular valve block 32 is fitted into the cavity 31, abutting a gasket 34 and sealed round its perimeter by an O-ring 35. A front cover 36 overlying the housing 30 includes a cylindrical boss 38 extending into the cavity 31 and sealed by an O-ring 39. A gasket 40 is disposed between the cover and the valve block. The parts 30, 32 and 36 are held together against the fluid pressure by three cap screws 42 provided with seals 43.

Below the seal 35, the housing 30 and valve block 32 define between them an annular chamber 44 within which is mounted a low pressure fuel filter 46. A fuel inlet 47 (FIG. 3) in the side wall of housing 30 connected to the fuel inlet line 5 discharges the fuel tangentially to the exterior of filter 46. The fuel flows inwardly through the filter within the cavity 44 and thence into a passage 48 (FIG. 4) drilled through the valve block 32 and housing 30. Passage 48 leads to a housing 50 of pump 4 which is fixed to the control system housing. The pump 4 takes the low pressure fuel and discharges it through a pump outlet 51 into a passage 52 through the bottom of the housing 30.

Pressurized fuel then flows through a passage 54 in the rear face of the valve block into the interior of a high pressure fuel filter 55 mounted in a cylindrical filter chamber 56 in the valve block. The filter 55 is of a common type and is held seated in the bottom of the recess 56 by a compression spring 58 seated in a recess in cover 36. Filter 55 corresponds to filter 7 of the schematic. The fuel is discharged from the filter chamber 56 to the balance valve 10, by-pass valve 19 and pressure relief valve 28. Referring to FIG. 7, a passage 8 drilled across the valve block 32 intersecting the filter chamber 56 leads to the balance valve 10. This passage also communicates with the pressure relief valve 28.

Figure 5:
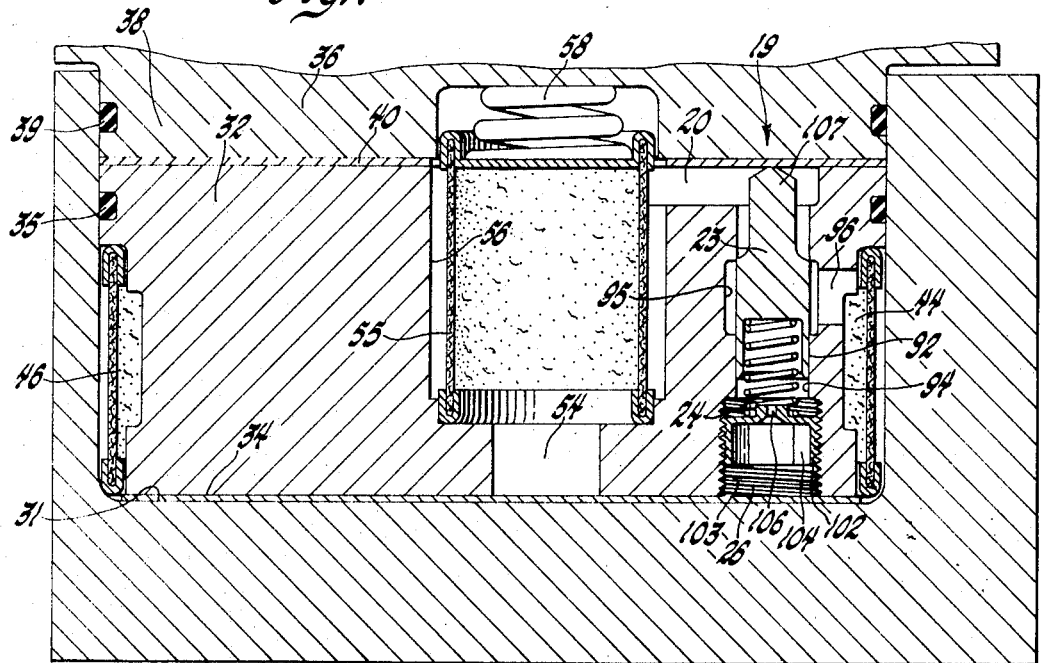
FIG. 5 is an enlarged cross sectional view taken on the plane indicated by the line 5—5 in FIG. 3.

Referring to FIG. 5, a slot 20 in the upper face of valve block 32 corresponds to the passage 20 shown on the schematic. It conducts fuel at pump discharge pressure to the pressure regulating by-pass valve 19.

Considering now the structure of the balance valve 10 shown in FIGS. 6 and 7, it includes a movable valve member 59 which may be termed a spool or piston reciprocable in a cylinder 60 defined by the valve block 32. The spool has a reduced diameter portion of neck 62 and a generally conical head 63 which engages the seat defined by an enlargement of the cylinder. The neck 62 is abreast of the inlet passage 8 for fuel at pump discharge pressure. When the head is seated as illustrated in these drawings, the valve blocks flow from passage 8 into conduit 12 defined by a slot in the rear face of the valve block 32, which leads to the flow sense valve 11. A cup-shaped slotted stop 66 which limits the maximum opening of the balance valve may be spot welded in place in the valve block.

The balance valve is biased to open by force exerted by solenoid device 14 which, as illustrated in FIG. 3, is fixed to the upper surface of the cover 36 by cap screws. The armature 16 of this device presses against a push rod 67 extending through the top cover and engaging the end of piston 59. Push rod 67 extends through bore 68 in cover 36 into which the housing of the solenoid device is piloted.

Figure 4:
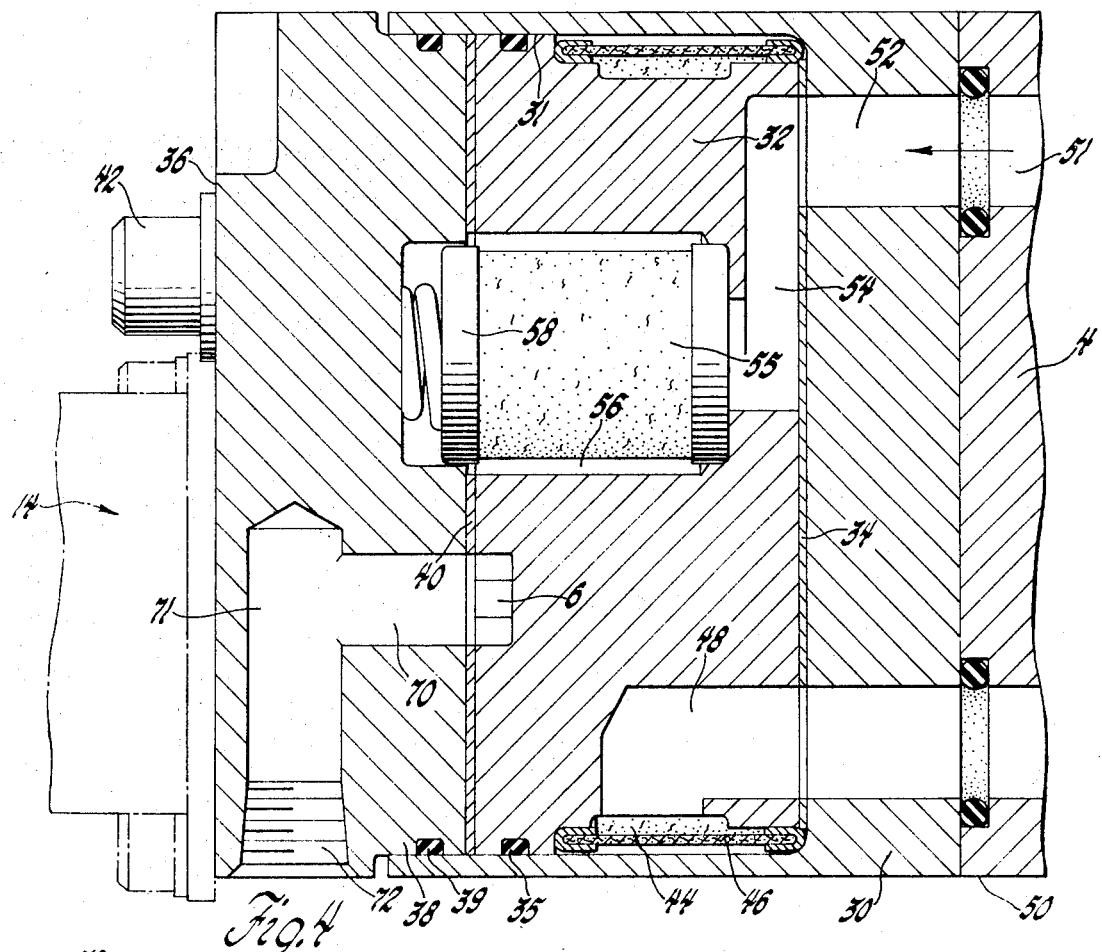
FIG. 4 is an enlarged cross sectional view of the same taken on the planes indicated by the line 4—4 in FIG. 3.

After passing through the balance valve 10 and passage 12, fuel flows through the flow sense valve 11 to the outlet conduit defined by a dogleg slot 6 milled in the front face of valve block 32. Conduit 6 communicates with the forward end of cylinder 60 so that valve spool 59 is biased to open by the pressure in the engine fuel outlet line. As illustrated in FIG. 4, the end of conduit 6 remote from the flow sense valve connects through intersecting passages 70 and 71 in the cover 36 with an outlet 72 which is suitably connected to the combustion apparatus of the engine.

The flow sense valve 11 (FIG. 6) includes a piston 74 reciprocable in a cylinder 75 which connects passage 12 with an enlarged cylindrical bore 76 leading into passage 6. As shown in FIG. 8, the flow sense valve piston 74 has a cylindrical outer surface an a boss 78 on its forward face. A bore 79 extends axially into the piston from a countersunk recess 80 in the rear face. A V-shaped notch 82 extends diametrically across the piston and extends forwardly from the rear face. This notch defines two metering orifices which open as the piston moves forwardly in cylinder 75 from the position shown in FIG. 3. Flow area is substantially proportional to the square of displacement from the beginning point of valve opening. The flow sense valve is biased to close by a compression spring 86 mounted between an abutment 87 engaging the head of the piston and a hollow abutment 88 fixed within the bore 76. The abutment 88 may be moved to the position causing the desired loading on the spring 86 and then be spot welded in place. Piston 74 is guided by a fluted shank 90 brazed to the piston. The flow sense valve may close completely. It is apparent that piston 74 has euqal areas exposed to the pressures in conduits 12 and 6 and is therefore biased open by the difference between these pressures. The balance valve 10 is biased to close by the same pressures. Fuel entering the solenoid device 14 exerts force on both ends of the armature so that the solenoid is not affected by fuel pressure. The details of this device are immaterial to my invention. The preferred form of a solenoid device is described in Deckard U.S. patent application Ser. No. 327,958, filed Jan. 30, 1973 now U.S. Pat. No. 3,805,203, of common ownership with this application.

The foregoing completes the description of the parts of the device which are in the direct fuel circuit to the engine.

The pressure regulating by-pass valve 19 is illustrated in FIG. 5. It includes a movable member or piston 23 including a skirt 92 which is guided in a cylinder 94. An annular recess 95 in the wall of the cylinder communicates through a port 96 with the low pressure filter chamber 44 which is upstream of pump 4. Piston 9 is biased in the direction to close the by-pass by compression spring 24 received in a socket in the piston and engaging an adjustable abutment 102. The position of abutment 102 determines the pressure level at which the by-pass valve opens. Abutment 102 may be threaded into an enlarged portion 103 of the cylinder 94 and have a hex socket 104 to facilitate adjustment. An orifice 106 through the abutment provides damping of movement of piston 23, since any such movement is attended by flow of fuel through orifice 106. Piston 23 terminates in a nose 107 which engages gasket 40 to limit movement of the piston, this limit allowing complete closure of the by-pass valve.

As previously noted, he by-pass valve is biased to open by pressure in the line 20 which is branched off from the pump discharge at filter chamber 56 and thus equals the pressure of fuel supplied to the balance valve 10. The rear end of the by-pass valve is subjected to pressure taken from downstream of the balance valve as illustrated in FIGS. 1 and 2. The portion 103 of the by-pass valve housing is at one end of the passage 12 in the rear face of the valve block, shown also in FIG. 6, so that in the form here illustrated the by-pass valve responds to pressure between the balance and flow sense valves as illustrated in the schematic of FIG. 1. It is, of course, a relatively simple matter to eliminate this connection and provide instead a passage leading from fuel outlet passage 6 to the cylinder portion 103 in accordance with the schematic of FIG. 2.

The maximum relief valve 28 shown in FIG. 7 connects the pump discharge passage 8 with the inlet of pump 4, specifically with the downstream side of low pressure filter 46 in chamber 44. The relief valve 28 includes a sleeve or liner 108 pressed into a stepped bore 110 extending from the upper face of valve block 32 into passage 8. Sleeve 108 has a port 111 which communicates through a drilled passage 112 with chamber 44. Sleeve 108 defines a seat 114 for the spherical movable valve member or ball 115 which is biased by the compression spring 116. This spring bears against the ball and the other end is seated in a socket 118 in the cover 36. The point at which the relief opens is determined by the area of the valve seat and the force of the spring, and thus may be suited to any particular installation by the dimensions of the sleeve 108 or the preload of spring 116.

The operation of the structure shown in FIGS. 3 through 8 should be clear from the foregoing, but may be treated briefy. Fuel from a low pressure supply enters the assembly through port 47, flows through the annular low pressure filter which encircles the valve block 32, and then through passage 48 into pump 4, and back through passages 51 and 52 from the pump into the high pressure filter 55. After passing through this filter, the fuel for the engine flows through passage 8 to the balance valve 10, and thence through passage 12 and the flow sense valve 11 to the passages 6, 70, and 71 leading to the outlet 72 to a conduit leading to the engine. The balance valve is biased to open by the pressure of metered fuel and to close by the pressure of fuel in conduit 12. The flow sense valve is biased to open by the same pressure differential. If no external force is exerted on valve spool 59, there will be no flow since the pressure of the fuel entering the balance valve through passage 9 is balanced on the ends of the valve spool. However, when the solenoid device 14 is energized to exert a force against the valve spool 59 to lift head 63 from seat 64, the pressure of the fuel delivered to conduit 12 times the effective area of the valve will equal the force exerted on the valve by the push rod 67. This pressure exerted on the piston 74 of the flow sense valve biases this valve in an opening direction against the spring 86. The spring has a linear characteristic, so that displacement of the valve will be proportional to fluid pressure. Because of the generally V-shaped ports in the piston 74, the area available for flow is substantially proportional to the square of displacement and thus flow, which is proportional to area times the square root of pressure drop, will be substantially proportional to pressure drop. The balance valve determines the force exerted on the flow sense valve and this force determines the amount of fuel flow. It should be understood that the shape of the port or ports in the flow sense valve 74 may be varied to vary the relation between pressure and flow and, by suitable configuration of the ports, the relation may be linear or may be something other than linear. This is a matter of choice. Pressure in the outlet connection 6 resists opening of the flow sense valve, but it aids opening of the balance valve, so the head across these valves remains constant regardless of back pressure in the outlet line.

The pressure regulating by-pass valve 19, which responds to the pressure drop across the balance valve in the form specifically illustrated in FIGS. 3 through 8, opens when the pressure drop across the balance valve overcomes the preload of spirng 24. The valve will open as far as necessary to by-pass excess fluid.

Normally, the maximum pressure relief valve 28 remains closed but if, for example, the flow of fuel to the engine is terminated by a shutoff valve or for any other reason the pressure becomes excessive, relief valve 28 opens and limits the pressure in the system.

It should be apparent to those skilled in the art that the system as described provides a very compact, simple, and effective apparatus for regulating fuel flow to an engine having varying pressures opposing fuel flow, and a very satisfactory answer to the provision of a fuel metering valve system responsive to an electrical signal such as is developed by electronic engine controls.

The detailed description of preferred embodiments of the invention for the purpose of explaining its principles is not to be considered as limiting or restricting the invention, as various modifications may be made by the exercise of skill in the art.

I claim:

1. Means for supplying fuel to an engine comprising, in combination, a source of fuel under pressure; a fuel supply line for the engine; and a balance valve and a flow sense valve connected in series between the source and the supply line; both the said valves being throttling valves including reciprocably mounted valve pistons oppositely biased by fuel pressures on equal areas; the balance valve being biased to open by supply line pressure, to close by pressure between the valves, and to open by means exerting a variable control force on its valve piston; the flow sense valve being biased to open by pressure between the valves, to close by pressure in the supply line, and to close by biasing means exerting a force increasing with displacement of its valve piston.

2. A combination as recited in claim 1 including means responsive to an electrical signal to exert the variable control force on the balance valve piston.

3. Means for supplying fuel to an engine comprising, in combination, a source of fuel under pressure; a fuel supply line for the engine; and a balance valve and a flow sense valve connected in series between the source and the supply line; both the said valves being throttling valves including reciprocably mounted valve pistons oppositely biased by fuel pressures on equal areas; the balance valve being biased to open by supply line pressure, to close by pressure between the valves, and to open by means exerting a variable control force on its valve piston; the flow sense valve being biased to open by pressure between the valves, to close by pressure in the supply line, and to close by biasing means exerting a force increasing with displacement of its valve piston; the flow sense valve including a contoured throttling member effective to generally linearize the relation between piston displacement and flow.

4. Means for supplying fuel to an engine comprising, in combination, a fuel pump; a fuel supply line for the engine; a balance valve and a flow sense valve connected in series between the pump and the supply line; both the said valves being throttling valves including reciprocably mounted valve pistons oppositely biased by fuel pressures on equal areas; the balance valve being biased to open by supply line pressure, to close by pressure between the valves, and to open by means exerting a variable control force on its valve piston; the flow sense valve being biased to open by pressure between the valves, to close by pressure in the supply line, and to close by biasing means exerting a force increasing with displacement of its valve piston; the flow sense valve including a contoured throttling member effective to generally linearize the relation between piston displacement and flow; and means responsive to pump discharge pressure and to a pressure downstream of the balance valve effective to maintain pump discharge pressure at a level higher than the said downstream pressure.

5. A system for supplying and metering fuel comprising, in combination, a source of fuel under pressure, an outlet line for fuel for connection to a user, a balance valve and a flow sense valve connected in series between the source and the user, both said valves being throttling valves, and means for exerting a variable control force, the balance valve being biased to close by the pressure drop across the flow sense valve and biased to open by the said variable control force so that the pressure drop is maintained proportional to the control force, and the flow sense valve being biased to open by the said pressure drop and biased to close by means developing a force which is a function of the opening of the valve increasing as the valve opens, so that the opening of the flow sense valve and the fuel flow are determined by the control force.

6. A system for supplying and metering fuel comprising, in combination, a source of fuel under pressure, an outlet line for fuel for connection to a user, a balance valve and a flow sense valve connected in series between the source and the user, both said valves being throttling valves, the balance valve being biased to closed by the pressure drop across the flow sense valve and biased to open by a variable control force so that the pressure drop is maintained proportional to the control force and the flow sense valve being biased to open by the said pressure drop and biased to close by means developing a force which is a function of the opening of the valve increasing as the valve opens, so that the opening of the flow sense valve and the fuel flow are determined by the control force, and means responsive to a variable electrical signal for exerting the said variable control force on the balance valve.

7. A system for supplying and metering fuel comprising, in combination, a source of fuel under pressure, an outlet line for fuel for connection to a user, a balance valve and a flow sense valve connected in series between the source and the user, both said valve being throttling valves, and means for exerting a variable control force, the balance valve being biased to close by the pressure drop across the flow sense valve and biased to open by the said variable control force so that the pressure drop is maintained proportional to the control force, and the flow sense valve being biased to open by the said pressure drop and biased to close by means developing a force which is a function of the opening of the valve increasing as the valve opens, so that the opening of the flow sense valve and the fuel flow are determined by the control force, the source of fuel including means to maintain the pressure of fuel delivered by the source substantially at a predetermined excess over pressure at a point between the balance valve and the outlet line.

* * * * *